(12) United States Patent
Kaku (10) Patent No.: US 9,599,174 B2
(45) Date of Patent: Mar. 21, 2017

(54) BRAKE DEVICE

(71) Applicant: TS TECH CO., LTD., Asaka-shi, Saitama (JP)

(72) Inventor: Hiroyuki Kaku, Tochigi (JP)

(73) Assignee: TS TECH CO., LTD., Saitama (JP)

(*) Notice: Subject to any disclaimer, the term of this patent is extended or adjusted under 35 U.S.C. 154(b) by 0 days.

(21) Appl. No.: 14/405,677

(22) PCT Filed: May 24, 2013

(86) PCT No.: PCT/JP2013/064452
§ 371 (c)(1),
(2) Date: Dec. 4, 2014

(87) PCT Pub. No.: WO2013/183462
PCT Pub. Date: Dec. 12, 2013

(65) Prior Publication Data
US 2015/0152927 A1    Jun. 4, 2015

(30) Foreign Application Priority Data

Jun. 7, 2012    (JP) .................................. 2012-130274

(51) Int. Cl.
*F16D 51/42*        (2006.01)
*F16D 51/12*        (2006.01)
(Continued)

(52) U.S. Cl.
CPC ............ *F16D 51/12* (2013.01); *B60N 2/168* (2013.01); *B60N 2/1889* (2013.01); *B60N 2/444* (2013.01);
(Continued)

(58) Field of Classification Search
CPC .......... F16D 51/32; F16D 51/34; F16D 51/36; F16D 51/42
(Continued)

(56) References Cited

U.S. PATENT DOCUMENTS 1,533,790 A * 4/1925 Dymock ................. F16D 51/42
                                                                188/323
1,561,905 A * 11/1925 Brown ..................... F16D 51/42
                                                                188/335
(Continued)

FOREIGN PATENT DOCUMENTS

CN        101407186        4/2009
DE        199 12 789 A1    9/2000
(Continued)

OTHER PUBLICATIONS

Extended European Search Report issued in counterpart European Patent Application No. 13799762.3 on Dec. 15, 2015 (8 pages).
(Continued)

*Primary Examiner* — Thomas Irvin
(74) *Attorney, Agent, or Firm* — Hamre, Schumann, Mueller & Larson, P.C.

(57) ABSTRACT

A brake device includes: an outer race having a cylindrical inner peripheral surface; at least two brake cams arranged inside the outer race in a circumferential direction, each brake cam having brake surfaces located at both ends in the circumferential direction of a side of the brake cam facing the outer race, each brake surface being contactable with the inner peripheral surface of the outer race; and an output-side rotary member arranged at radially inner sides of the respective brake cams, the output-side rotary member including contact portions contactable with surfaces of the brake cams facing the radially inner sides. Contact points at which the respective contact portions and the respective brake cams are contactable are on an axis-of-rotation side of a both-end reference plane (plane connecting outer ends of the respective brake surfaces located at the both ends of to corresponding brake cam), or on the both-end reference plane.

17 Claims, 9 Drawing Sheets

(51) Int. Cl.
| | |
|---|---|
| *F16D 51/36* | (2006.01) |
| *F16D 63/00* | (2006.01) |
| *B60N 2/16* | (2006.01) |
| *F16D 65/22* | (2006.01) |
| *B60N 2/44* | (2006.01) |
| *B60N 2/18* | (2006.01) |
| *F16D 67/00* | (2006.01) |
| *F16D 41/08* | (2006.01) |
| *F16D 43/02* | (2006.01) |
| *F16D 121/14* | (2012.01) |
| *F16D 125/30* | (2012.01) |

(52) U.S. Cl.
CPC ........... *F16D 41/082* (2013.01); *F16D 43/02* (2013.01); *F16D 51/36* (2013.01); *F16D 51/42* (2013.01); *F16D 63/00* (2013.01); *F16D 65/22* (2013.01); *F16D 67/00* (2013.01); *F16D 2121/14* (2013.01); *F16D 2125/30* (2013.01)

(58) Field of Classification Search
USPC ..................... 188/78, 79, 323, 324
See application file for complete search history.

(56) References Cited

U.S. PATENT DOCUMENTS

| | | | | |
|---|---|---|---|---|
| 1,575,426 | A * | 3/1926 | Harry | F16D 51/60 188/78 |
| 1,844,345 | A * | 2/1932 | Carr | F16D 51/42 188/196 B |
| 1,908,228 | A * | 5/1933 | Dotson | F16D 51/42 188/323 |
| 1,996,724 | A * | 4/1935 | Hoffer | F16D 51/32 188/78 |
| 2,002,785 | A * | 5/1935 | Melling | F16D 51/32 188/78 |
| 2,171,289 | A * | 8/1939 | Eakin | F16D 51/42 188/323 |
| 6,253,894 | B1 | 7/2001 | Schumann et al. | |
| 6,290,028 | B1 * | 9/2001 | Liu | B62L 5/00 188/24.14 |
| 8,376,115 | B2 | 2/2013 | Cai et al. | |
| 2008/0136241 | A1 | 6/2008 | Stemmer et al. | |
| 2008/0136242 | A1 | 6/2008 | Stemmer et al. | |
| 2010/0219037 | A1 | 9/2010 | Cai et al. | |
| 2011/0233010 | A1* | 9/2011 | Drewes | F16D 51/10 188/78 |
| 2012/0161488 | A1 | 6/2012 | Ishihara et al. | |

FOREIGN PATENT DOCUMENTS

| | | |
|---|---|---|
| EP | 2 272 707 A2 | 1/2011 |
| JP | 2002-511035 A | 4/2002 |
| JP | 2002-168276 A | 6/2002 |
| JP | 2008-543455 A | 12/2008 |
| JP | 2011-15894 A | 1/2011 |
| JP | 2012-56397 A | 3/2012 |

OTHER PUBLICATIONS

Office Action issued in counterpart Chinese patent application No. 201380029531.7 on Apr. 1, 2016, and corresponding English translation.

Office Action issued for Chinese application No. 201380029531.7, dated Oct. 24, 2016, 12 pages including English translation.

* cited by examiner

BRAKE DEVICE

TECHNICAL FIELD

The present invention relates to a brake device for use in a height adjustment mechanism for a vehicle seat, or the like.

BACKGROUND ART

In a height adjustment mechanism for a vehicle seat, a brake device is used which is configured such that an output shaft is caused to rotate by a swinging-up/swinging-down operation of a lever provided at an input side thereof but is prevented from rotating even when a force which is derived from the weights of the seat and an occupant seated thereon and by which the seat is biased downward is applied to the output shaft (Patent Literature 1).

In such a brake device, an outer race having a cylindrical inner peripheral surface, a plurality of brake cams facing this inner peripheral surface (clamping members in Patent Literature 1), and an output-side rotary member disposed inside the brake cams (a bolt having wings in Patent Literature 1) are provided. The rotational motion received by the brake cams is transmitted from the brake cams to cause a motion of the output-side rotary member, while if the output-side rotary member is caused to rotate, a force imparted to the brake cams by the output-side rotary member brought into contact with the brake cams mainly as a force pressing the brake cams against the outer race, and a rotational force imparted to the brake cams by the output-side rotary member cannot go beyond the frictional force which can be produced between the brake cams and the outer race, so that the brake cams cannot rotate.

In this brake device, two brake cams are arranged adjacently in a circumferential direction.

CITATION LIST

Patent Literature

Patent Literature 1: JP 2002-511035 A

In recent years, a largest possible weight reduction is in increasing demand for such a brake device as described above. Also, the brake device need be stable in operation so as to achieve a favorable feel of operation.

SUMMARY OF INVENTION

It is one aspect of the present invention to reduce weight of a brake device while maintaining a braking capability required for the brake device.

It is another aspect of the present invention to make a brake device stable in operation.

According to one or more of embodiments of the present invention, a brake device is provided which comprises: an outer race having a cylindrical inner peripheral surface; at least two brake cams arranged inside the outer race in a circumferential direction, each brake cam having brake surfaces located at both ends in the circumferential direction of a side of the brake cam facing the outer race, each brake surface being contactable with the inner peripheral surface of the outer race; and an output-side rotary member arranged at radially inner sides of the respective brake cams, the output-side rotary member including contact portions contactable with surfaces of the brake cams facing the radially inner sides, wherein a rotational motion received by the brake cams is transmitted to effect a motion of the output-side rotary member, while a rotational motion of the output-side rotary member as effected in at least one direction is not transmitted, effecting no motion of the brake cams. Contact points at which the respective contact portions and the respective brake cams are contactable with each other are on an axis-of-rotation side that is one side of a both-end reference plane on which an axis of rotation of the output-side rotary member is located, or on the both-end reference plane, the both-end reference plane being a plane connecting outer ends of the respective brake surfaces located at the both ends of a corresponding brake cam.

With this configuration, the contact points at which the respective contact portions and the respective brake cams are contactable with each other are on the axis-of-rotation side (the side on which the axis of rotation of the output-side rotary member is located) of the both-end reference plane (the plane connecting outer ends of the respective brake surfaces located at the both ends of a corresponding brake cam), or on the both-end reference plane; therefore, the force to be transmitted from the contact points to the brake surfaces can be transmitted directly without loss due to diversion. Thus, the force given from the output-side rotary member to the brake cams can efficiently produce a braking force, and the weight of the brake cams can be reduced, so that reduction in the weight of the brake device can be achieved, accordingly.

The brake cams provided in the brake device as described above may preferably comprise three or more brake cams arranged in the circumferential direction.

One factor in determining an upper limit to the braking force in the brake device is a test of whether the outer race withstands a force received from the cams. Among conventional brake devices, only a particular type of brake device in which two brake cams are arranged in the circumferential direction is known in the art. Provision of three or more brake cams arranged in the circumferential direction makes the points of application of the force from the brake cams to the outer race distributed over the circumference, so that the outer race is more likely to withstand this force. As a result, the thickness of the outer race can be reduced for weight reduction, and the widths of the outer race and/or the cam brakes can be reduced, or the numbers of the outer races and/or the cam brakes arranged in an axial direction can be reduced for weight reduction.

The brake device as described above may preferably be configured such that the brake cams provided therein comprise three brake cams arranged in the circumferential direction, wherein the contact portions are contactable with the surfaces of the brake cams facing the radially inner sides in positions each shifted from a center plane that is a plane containing a center axis of the inner peripheral surface of the outer race and a midpoint between inner ends of the brake surfaces located at the both ends of a corresponding brake cam, and wherein an amount of shift of each contact portion from the center plane is not more than 16% of a distance between the inner ends of the brake surfaces located at the both ends of each of the brake cams.

In this configuration where three brake cams are provided and arranged in the circumferential direction, if contact points would be in positions shifted so large from the center plane, the force transmitted from the output-side rotary member to the brake cams would very likely act in a way that drives the brake cams to rotate; accordingly, a rotational force (rotation moment) received by the output-side rotary member would undesirably cause the brake cams to rotate, which means that the brake device would lose its functionality. For this reason, with this configuration where the amount of shift of each contact point from the center plane is restricted to not more than 16% of the distance between the inner ends of the brake surfaces located at the both ends of each of the brake cams, the brake can be actuated to work properly.

In any the brake devices as described above, the contact portions may be provided on both sides of the center plane for each of the brake cams, and configured such that the rotational motion of the output-side rotary member as effected in either direction is not transmitted to the brake cams.

With this configuration, even when a rotational force received by the output-side rotary member is in either direction, normal or reverse, which may be permitted depending on the device applied, the brake cams can be prevented from making a rotational motion.

Any of the brake devices as described above may be configured such that the contact portions are contactable with the surfaces of the brake cams facing the radially inner sides in positions each shifted from a center plane that is a plane containing a center axis of the inner peripheral surface of the outer race and a midpoint between inner ends of the brake surfaces located at the both ends of a corresponding brake cam, wherein the contact portions are formed as protrusions configured to protrude toward radially outside of the output-side rotary member, the protrusions being arranged in positions such that the protrusions come on the center plane when the output-side rotary member receives a rotational force.

As described above, the amount of shift in positions of the contact points (at which the contact portions are contactable with the brake cams) from the center plane affects the ability or inability of producing the braking force. Accordingly, in this configuration where the contact portions are formed as protrusions, such protrusions may be arranged in such positions that the contact points is so close to the central plane as to bring the protrusions on the center plane, whereby the brake can be operated to work properly.

In the brake device which comprises three or more brake cams arranged in the circumferential direction, it may be preferable that the axis of rotation of the output-side rotary member is located inside a polygon as formed by connecting the contact points at which the respective brake cams are contactable with the output-side rotary member.

With this configuration, the force transmitted from the brake cams to the output-side rotary member is distributed around the axis of rotation of the output-side rotary member, and serves to stably support and rotate the output-side rotary member. Conversely, the force transmitted from the output-side rotary member to the brake cams also serves to make the position of the output-side rotary member stable. Accordingly, the stable operation of the brake device is ensured, so that a good operating feel can be provided.

DESCRIPTION OF EMBODIMENTS

Figure 1:
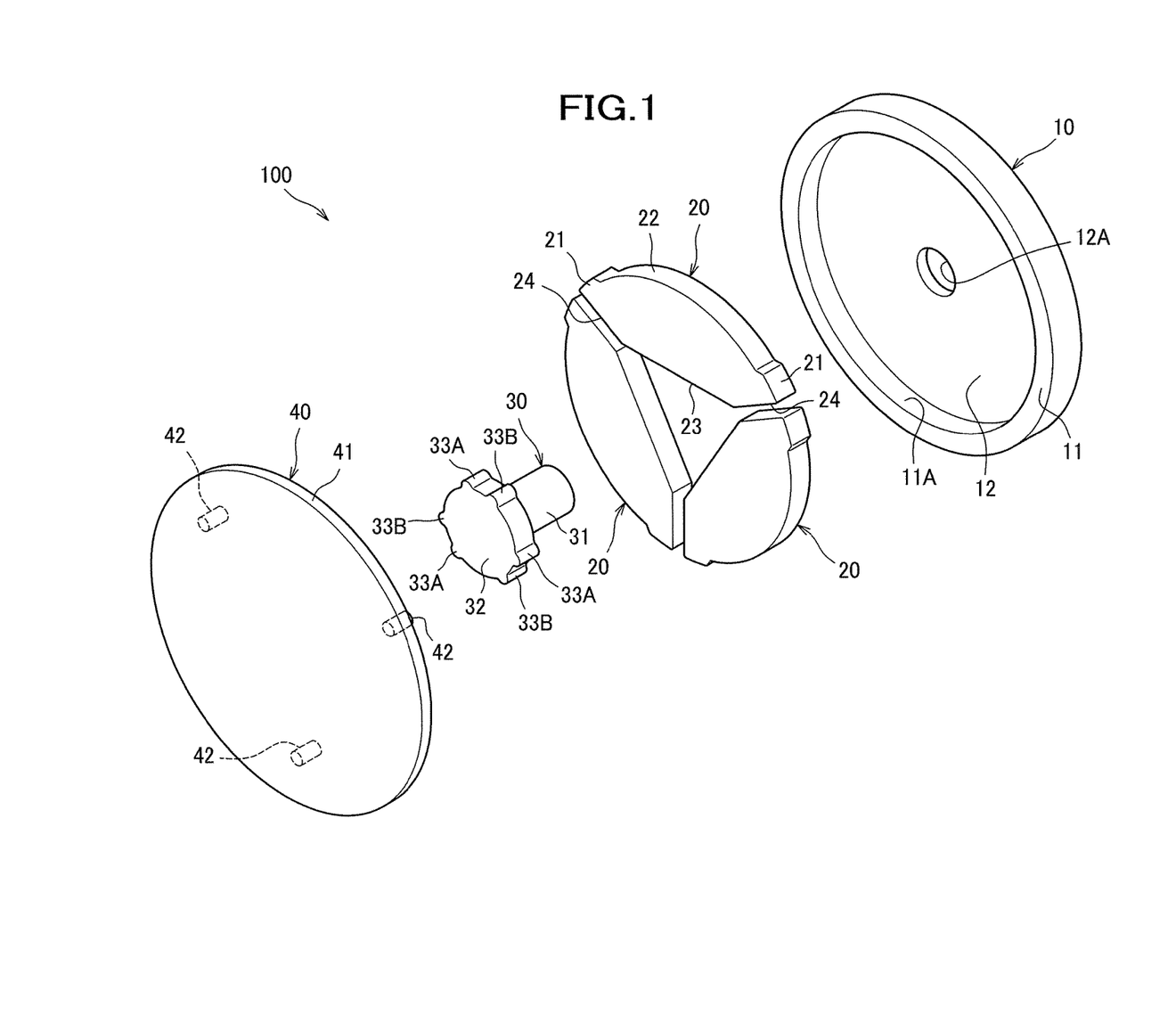
FIG. 1 is an exploded perspective view of a brake device according to one embodiment.

Hereafter, a detailed description will be given of an embodiment of the present invention with reference made to the drawings where appropriate. As shown in FIG. 1, a brake device 100 according to one embodiment includes an outer race 10, brake cams 20, an output-side rotary member 30 and an input-side rotary member 40.

The outer race 10 includes an annular portion 11 having a predetermined thickness and a sidewall 12 provided at one side of the annular portion 11. The annular portion 11 has an inner peripheral surface 11A shaped like a cylinder (having a circular cross section). The sidewall 12 has a through hole 12A formed in a position thereof corresponding to a center axis of the inner peripheral surface 11A.

The brake cams 20 are members configured to produce a braking force at an interface with the outer race 10; three brake cams 20 are arranged inside the outer race 10 equidistantly in a circumferential direction. Each brake cam 20 has brake surfaces 21 located at both ends (in the circumferential direction) of a side of the brake cam facing the inner peripheral surface 11A of the outer race 10, i.e., an outer peripheral surface side of the brake cam, and each brake surface is configured as a protruded surface contactable with the inner peripheral surface 11A of the outer race 10. The brake surface 21 has a cylindrical surface having the same radius of curvature as that of the inner peripheral surface 11A of the outer race 10, so that when the brake cam 20 is pressed toward radially outside, the brake surface 21 is brought into intimate contact with the inner peripheral surface 11A of the outer race 10.

Figure 2:
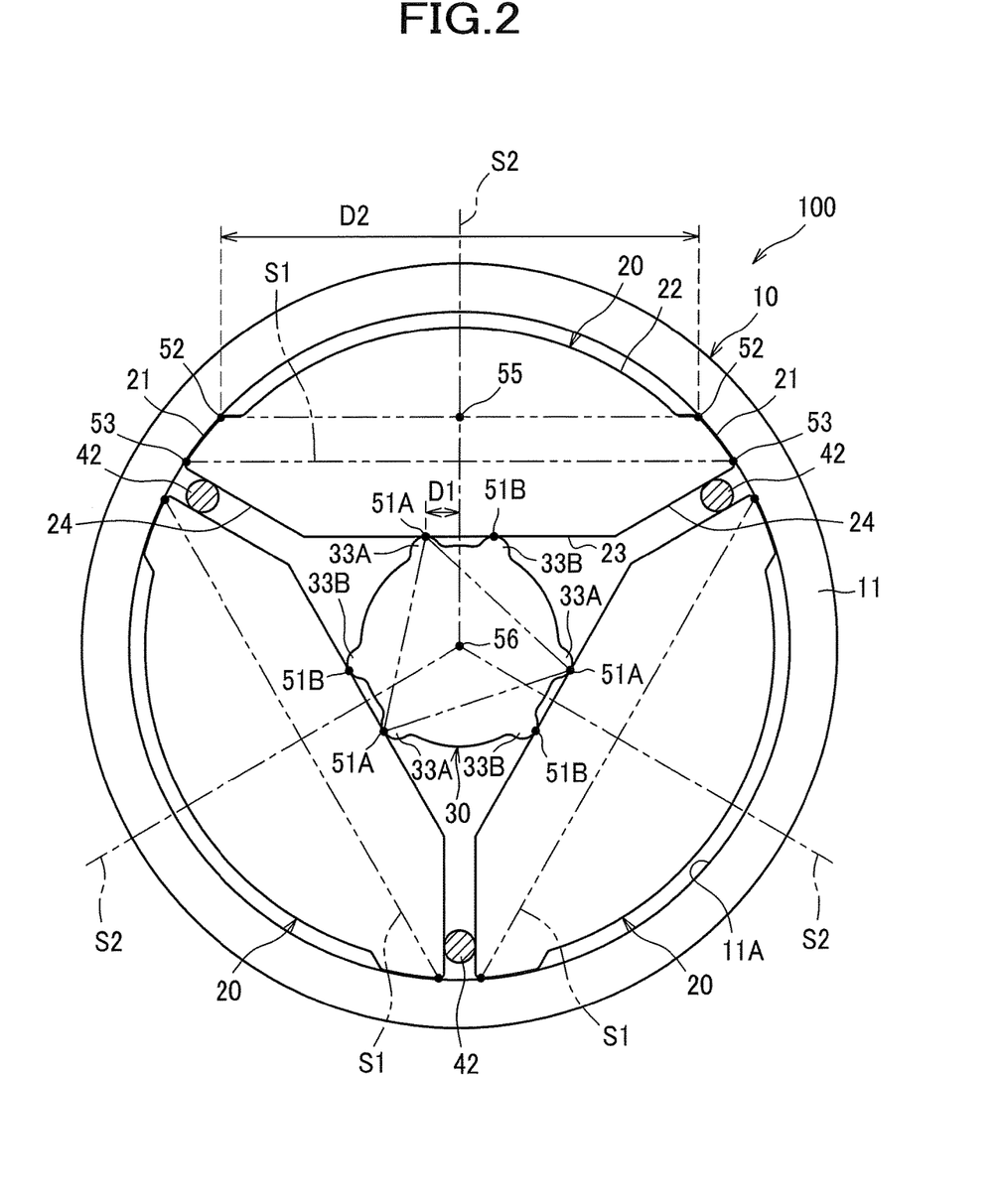
FIG. 2 is a sectional view of a brake device according to one embodiment.

The brake cam 20 has an outer peripheral surface 22 located between the brake surfaces 21 provided at both ends of the outer peripheral surface side, which outer peripheral surface 22 is shaped like a cylindrical surface having a radius smaller than that of the brake surface 21. A surface of the brake cam 20 facing a radially inner side (herein, radial and circumferential directions may be designated, in this specification, with reference to the inner peripheral surface 11A of the outer race 10) is a flat surface facing the center axis of the outer race 10. This flat surface is a contact surface 23 (one example of a cam-side contact portion) that is contactable with an output-side rotary member 30 that will be described later. The contact surface 23 is, as shown in FIG. 2, located on an axis-of-rotation 56 side that is an inner side (on which an axis 56 of rotation of the output-side rotary member 30 is located) of a both-end reference plane S1 that is a plane connecting outer ends 53 of the brake surfaces 21 located at the both ends of the brake cam 20. The brake cam 20 further has rotation input surfaces 24 located at ends of the brake cam 20 facing in the circumferential directions, which rotation input surfaces 24 connect the respective ends of the contact surface 23 with the corresponding outer ends of the two brake surfaces 21. It is understood that all of the three brake cams 20 have the same construction.

The output-side rotary member 30 is, as shown in FIG. 1, arranged at the inner sides of the three brake cams 30, and comprises a shaft 31, and action site 32 provided at an end of the shaft 31.

The shaft 31 extends lengthwise toward the sidewall 12 of the outer race 10, protrudes through the through hole 12A to outside, and engages another part. For example, a gear may be provided at a protruded end of the shaft 31, and configured to engage with an input gear for receiving a driving force for a height adjustment mechanism of a vehicle seat.

The action site 32 is shaped substantially like a disc, and comprises first protrusions 33A and second protrusions 33B provided along its rim, which first and second protrusions 33A, 33B are configured, as shown in FIG. 2, to protrude toward the contact surface 23 of each brake cam 20.

The first protrusions 33A are contact portions (one example of output-side contact portions) contactable with the contact surface 23 when a clockwise rotational force as in FIG. 2 is received by the output-side rotary member 30, and the total three protrusions 33A, one for each contact surface 23, are provided. The second protrusions 33B are contact portions (one example of output-side contact portions) contactable with the contact surface 23 when a counterclockwise rotational force as in FIG. 2 is received by the output-side rotary member 30, and the total three protrusions 33B, one for each contact surface 23, are provided.

Contact points 51A at which the first protrusions 33A are contactable with the contact surfaces 23 are positioned on the axis-of-rotation 56 side that is an inner side (on which the axis 56 of rotation of the output-side rotary member 30 is located) of the both-end reference plane S1 connecting the outer ends 53 of the brake surfaces 21 located at the both ends of the corresponding brake cam 20. The contact points 51A may be on the both-end reference plane S1.

The contact points 51A are in positions shifted from a center plane S2 containing a center axis (which coincides with the axis 56 of rotation) of the inner peripheral surface 11A of the outer race 10 and a midpoint 55 between inner ends 52 of the respective brake surfaces 21. The amount D1 of this shift affects the transmission of the rotational force between the brake cams 20 and the output-side rotary member 30 in such a manner that the larger the amount D1, the more efficient the transmission of the rotational force becomes, while the smaller the amount D1, the less efficient the transmission of the rotational force becomes. Consequently, if the mount D1 of shift would be too large, the brake cams 20 would rotate upon receipt of a rotational force by the output-side rotary member 30, so that a braking force could not be produced. In an embodiment where two brake cams 20 are arranged in the circumferential direction (see FIG. 6), such an amount of shift can be made large enough, and thus no particular care have been taken for this amount D1 of shift; however, in an alternative embodiment where three or more brake cams 20 are arranged in the circumferential direction, this amount D1 of shift is critical. For example, where three brake cams 30 are arranged in the circumferential direction, it may be preferable that the amount D1 of shift be not more than 16% of a distance D2 between the inner ends 52 of the brake surfaces 21 located at the both ends of each brake cam 20.

Whether or not the braking force is produced effectively depends upon a coefficient of friction between the brake surfaces 21 of the brake cams 20 and the inner peripheral surface 11A of the outer race 10; therefore, the amount D1 of shift so provided as to fall within a range of magnitude mentioned above represents a condition under which the braking force can be exerted stably even when the coefficient of friction is relatively small, which condition may thus not be understood to be indispensable.

Where the contact portions are formed as the first protrusions 33A and the second protrusions 33B configured to protrude toward radially outside of the output-side rotary member 30 as in the present embodiment, the first protrusions 33A and the second protrusions 33B may preferably be arranged in positions such that the protrusions come across the center plane S2. Such a fair degree of closeness of the protrusions (contact points 51A, 52A) to the center plane S2 as implied by the above configuration can be used as a guideline and considered to result in good operation of the brake.

Contact points 51B at which the second protrusions 33B are contactable with the contact surfaces 23 are also positioned on the axis-of-rotation 56 side (on which the axis 56 of rotation of the output-side rotary member 30 is located) of the both-end reference plane S1. Similar to the contact points 51A, the contact points 51B may also be on the both-end reference plane S1. The contact points 51B are in positions shifted from the center plane S2 by the amount D1 of shift (not shown).

As described above, the brake device 100 is configured to have its amount D1 of shift adjusted to an appropriate magnitude, so that a rotational motion received by the brake cams 20 is transmitted to effect a motion of the output-side rotary member 30, while a rotational motion of the output-side rotary member 30 is not transmitted, effecting no motion of the brake cams 20. In the present embodiment, for each brake cam 20, the first protrusion 33A and the second protrusion 33B are provided one on either side of the center plane S2, and the amounts D1 of shift of the contact points 51A, 51B from the center plane S2 are equal to each other, so that the rotational motion of the output-side rotary member 30 as effected in either direction is not transmitted to the brake cams 20.

It is to be understood that the contact points 51A, 51B in this embodiment are each designed to be linear junction in three-dimensional view. The contact points may be designed to have some areas at which contact is established, and it is likely the case depending upon an embodiment practiced; thus, the contact points consistent with the present invention may encompass such configurations.

The output-side rotary member 30 is arranged to have its axis 56 of rotation located inside a triangle as formed by connecting the contact points 51A at which the three first protrusions 33A are contactable with the brake cams 20. Similarly, the axis 56 of rotation is also located inside a triangle (not shown) as formed by connecting the contact points 51B at which the three second protrusions 33B are contactable with the brake cams 20. Since the axis 56 of rotation is surrounded by the contact points 51A or the contact points 51B as described above, a force exerted between the output-side rotary member 30 and the brake cams 20 at the contact points 51A or the contact points 51B acts as if the brake cams 20 would grasp the output-side rotary member 30 from outer sides. Therefore, the forces transmitted from the brake cams 20 to the output-side rotary member 30 are given from directions surrounding the axis 56 of rotation of the output-side rotary member 30 to thereby rotate the output-side rotary member 30 while stably supporting the output-side rotary member 30. Conversely, the forces transmitted from the output-side rotary member 30 to the brake cams 20 also serve to stabilize the position of the output-side rotary member 30. Accordingly, the brake device 100 can be operated stably, and a good operating feel can be achieved.

As shown in FIG. 1, the input-side rotary member 40 comprises a disc-shaped main body portion 41, and three pins 42 protruding from the main body portion 41 toward the sidewall 12 of the outer race 10. The pins 42 are configured to be fitted in interstices provided between three brake cams 20, and thus positioned and dimensioned to fit interstices between the rotation input surfaces 24. Accordingly, the pins 42 are arranged at an interval of 120 degrees around the axis 56 of rotation of the output-side rotary member 30. To be more specific, the pins 42 are disposed in positions close to radially outer ends of the rotation input surfaces 24 so that the rotational force of the brake cams 20 can be transmitted easily.

A description will be given of an operation of the brake device 100 configured as described above.

Figure 3:
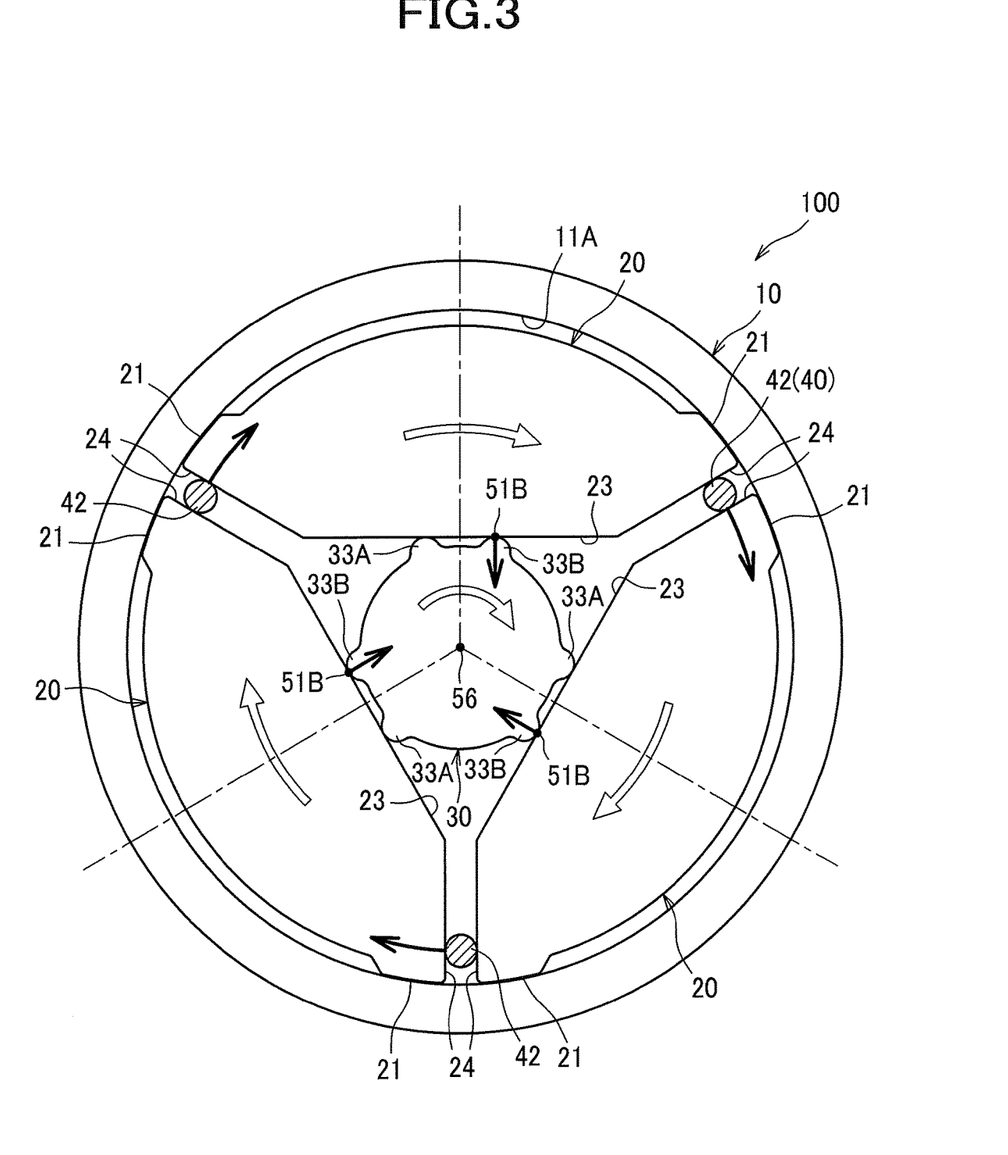
FIG. 3 is a diagram for explaining an operation of the brake device to be carried out when a rotational force is given to an input-side rotary member.

As shown in FIG. 3, when a clockwise rotational force as illustrated in this drawing is given to the input-side rotary member 40, the three pins 42 press the rotation input surfaces 24 (facing clockwise direction) of the brake cams 20, and impart a rotational force to each brake cam 20. Each brake cam 20 with its contact surface 23 brought into contact with the opposed second protrusion 33B of the output-side rotary member 30 imparts a clockwise rotational force from the contact point 51B to the output-side rotary member 30. Accordingly, as the input-side rotary member 40 is caused to rotate clockwise, the brake cams 20 and the output-side rotary member 30 are integrated and caused to rotate clockwise together.

When the input-side rotary member 40 is caused to rotate in a counterclockwise direction of the drawing, the mode of application of the force and the direction of rotation are reversed, and the brake cams 20 and the output-side rotary member 30 are integrated and caused to rotate counterclockwise together.

Figure 4:
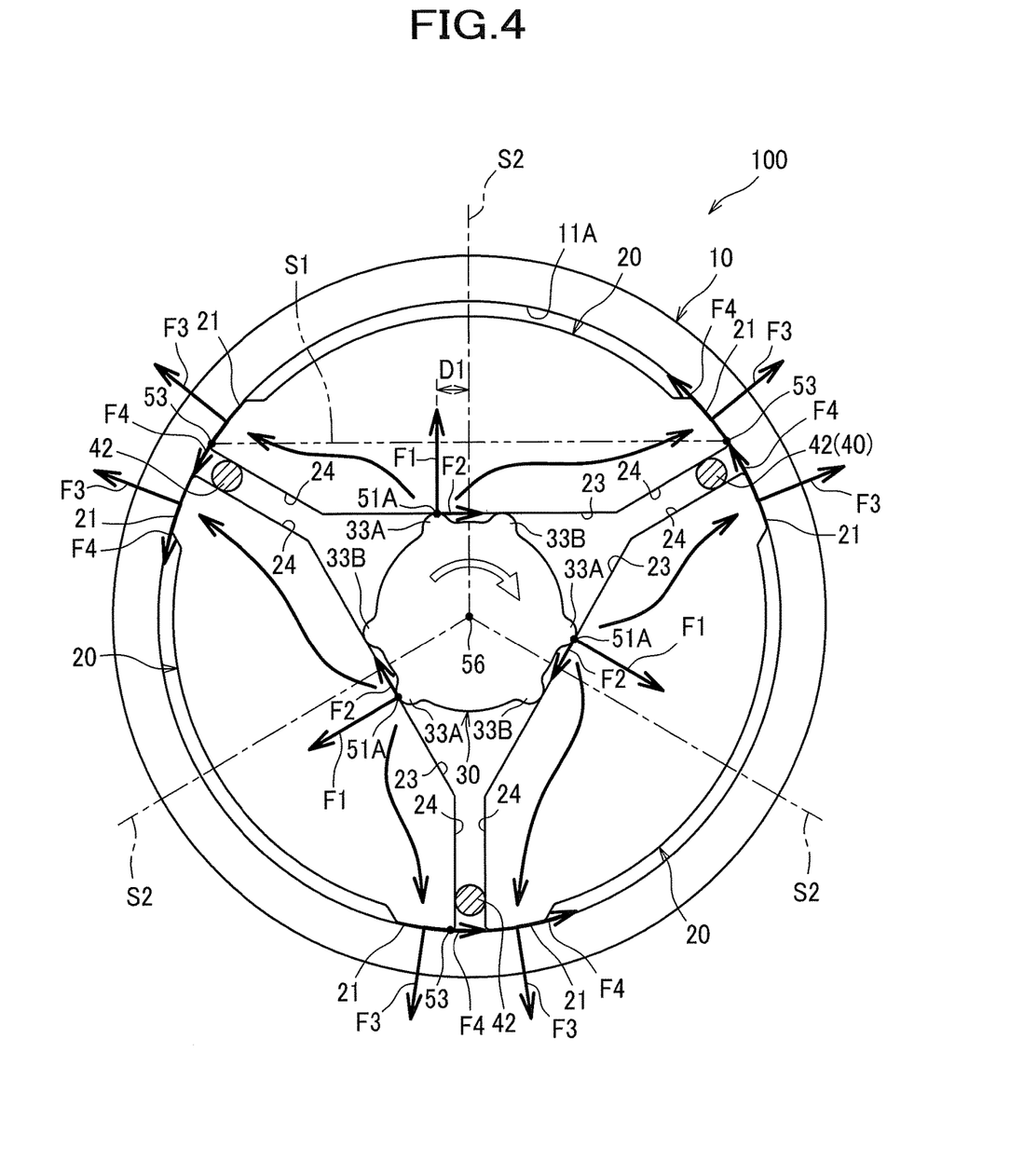
FIG. 4 is a diagram for explaining an operation of the brake device to be carried out when a rotational force is given to an output-side rotary member.

As shown in FIG. 4, when a clockwise rotational force as illustrated in this drawing is given to the output-side rotary member 30, the three first protrusions 33A are brought into contact with the contact surfaces 23 of the corresponding brake cams 20, and press the contact surfaces 23 in a radially outward direction. Since the contact points 51A are in positions shifted from the respective center planes S2 by an amount D1 of shift, these forces F1 pressing the contact surfaces 23 act on the brake cams 20, and tend to cause the brake cams 20 to rotate clockwise with a magnitude varying according to the amount D1 of shift. Furthermore, frictional forces F2 produced at the contact points 51A also act, slightly, on the brake cams 20 and tend to cause the brake cams 20 to rotate clockwise.

However, the forces F1 produce forces F3 which press the brake cams 20 against the outer race 10 with their brake surfaces 21 pressed on the inner peripheral surface 11A. Also, in reaction to the forces F3, frictional forces F4 resisting the force tending to cause the brake cams 20 to rotate clockwise are produced between the inner peripheral surface 11A and the brake surfaces 21. In the brake device according to the present embodiment, elements which determine the amount D1 of shift, the distance D2, a coefficient of friction between the brake cams 20 and the outer race 10, and other parameters are properly set, so that the force that tends to cause the brake cams 20 to rotate clockwise could not go beyond the frictional forces F4; therefore, the output-side rotary member 30, the brake cams 20 and the input-side rotary member 40 could not rotate relative to the outer race 10. In other words, the brake device 100 can produce a braking force.

When the output-side rotary member 30 is caused to rotate in a counterclockwise direction of the drawing, the mode of application of the force is reversely effected; therefore, the output-side rotary member 30, the brake cams 20 and the input-side rotary member 40 could not rotate relative to the outer race 10. In other words, the brake device 100 can produce a braking force.

Figure 5:
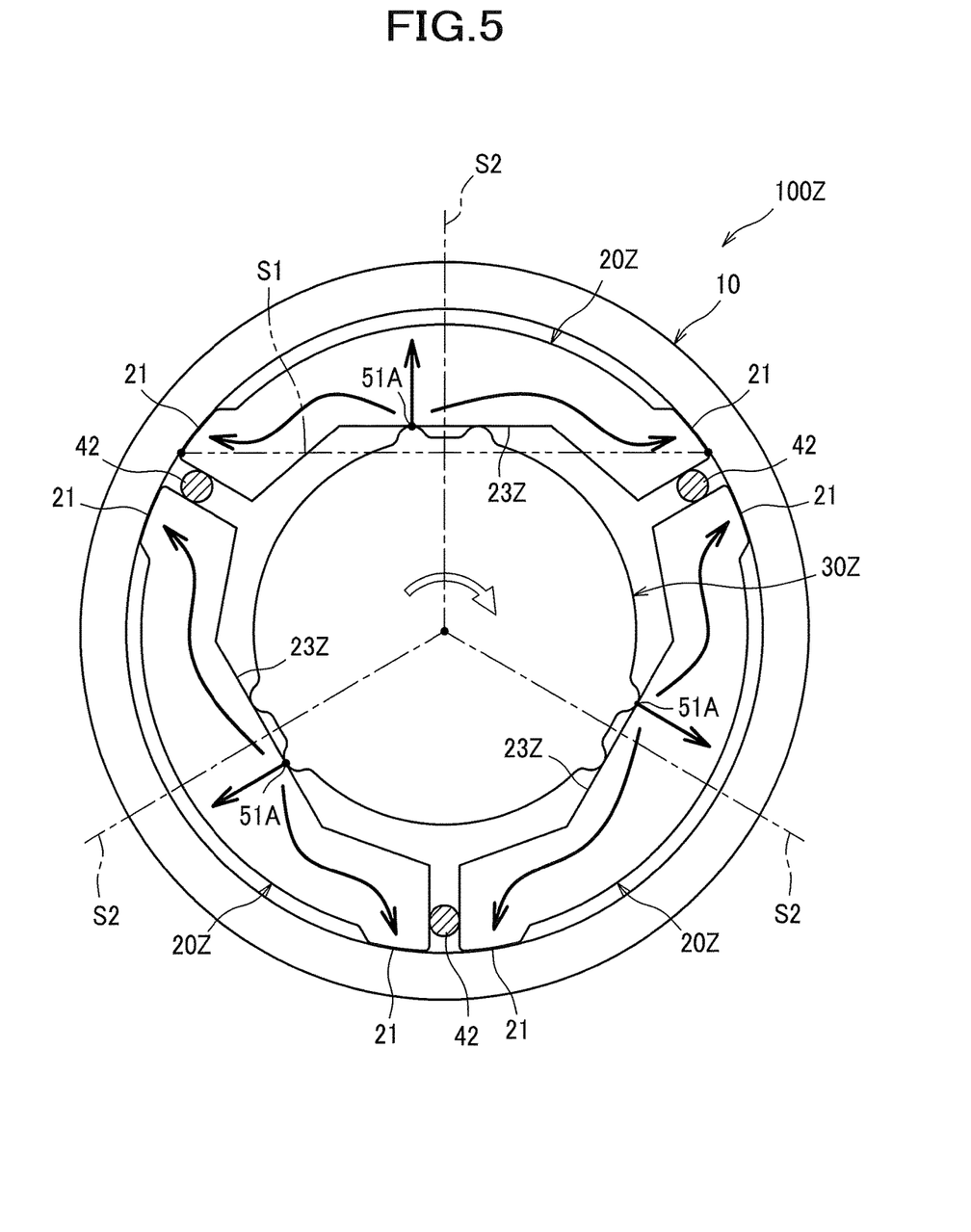
FIG. 5 is a diagram for explaining an operation of a brake device configured as an example provided for reference purposes to be carried out when a rotational force is given to an output-side rotary member.

Meanwhile, the brake device 100 according to the present embodiment is configured such that the contact points 51A are each disposed on the inner side of the both-end reference plane S1, and thus the force received by the brake cams 20 at the contact points 51A are transmitted straightforward (without following a path deviated so much backward) toward the brake surfaces 21 opposite with the contact surfaces 23, as indicated by arrows in the drawing. This action may be demonstrated further by comparison with a brake device 100Z shown in FIG. 5 in which three brake cams 20Z are arranged in the circumferential direction (note that this is not an arrangement hitherto known in the art). In the brake device 100Z shown in FIG. 5, the contact surfaces 23Z of the brake cams 20Z are each disposed on the radially outer side of the both-end reference plane S1, and thus the contact points 51A at which the output-side rotary member 30Z and the brake cams 20Z are contactable are on the radially outer side of the both-end reference plane S1. Accordingly, the force received by the brake cams 20Z at the contact points 51A are transmitted along a path of transmission of the force which detours as if it would be deviated backward. Such a path configuration of the force applies also in the conventional brake devices as disclosed in Patent Literature 1 and other documents where two brake cams are arranged in the circumferential direction. To be more specific, transmission of the forces from the contact points to the brake surfaces in the conventional brake devices is not efficient, while transmission of the forces from the contact points 51A to the brake surfaces 21 in the brake device according to this embodiment is efficient, so that the braking force can be produced efficiently. This makes it possible to slim down the brake cams 20 and/or the outer race 10, so that the brake device 100 as a whole can be made lightweight.

The next discussion is intended to focus on the limitations on the braking force of the brake device 100. The braking force depends mainly on the rigidity of the brake cams 20 and the strength and rigidity of the outer race 10.

As shown in FIG. 4, a rotational force given in the clockwise direction to the output-side rotary member 30 causes the output-side rotary member 30 to push the brake cams 20 radially outward, and causes the brake cams 20 to yield to outwardly bending pressure and deform at the contact points 51A. As the deformation becomes greater, the output-side rotary member 30 gradually rotates clockwise, and the limit of the braking force is reached when the first protrusions 33A (contact points 51A) come across the center plane S2.

Also, the force F3 of the brake surfaces 21 pressing the inner peripheral surface 11A of the outer race 10 imposes a stress on the outer race 10 and causes the outer race 10 to become distorted. The limit of the braking force is reached when the aforementioned stress reaches the limit of the strength of the outer race 10 (e.g., yield stress), or when the distortion of the outer race 10 causes the brake cams 20 to undergo displacement toward radially outward directions and the first protrusions 33A (contact points 51A) come across the center plane S2.

Since the brake device 100 according to the present embodiment illustrated herein comprises three brake cams 20 arranged in the circumferential direction, six spots are provided at which the brake surfaces 21 press the outer race 10 outward, and the number of spots is greater than that (four spots) of the conventional devices in which two brake cams are arranged in the circumferential direction. Therefore, the forces applied to the outer race 10 are distributed in the circumferential direction, so that the force imposed on one spot is reduced. Accordingly, the strength and the rigidity of the outer race 10 is evaluated to greater advantage in comparison with conventional devices, and the outer race 10 can be made thinner in its wall thickness and/or the size in the axial direction or the number of the outer races can be reduced so that the brake device 100 can be made lightweight.

In the present embodiment, as described above, the axis 56 of rotation of the output-side rotary member 30 is located inside a triangle (polygon) as formed by connecting the contact points 51A or by connecting the contact points 51B, and the forces transmitted from the brake cams 20 to the output-side rotary member 30 are distributed around the axis 56 of rotation of the output-side rotary member 30, and serve to stably support and rotate the output-side rotary member 30. Reversely, the forces transmitted from the output-side rotary member 30 to the brake cams 20 also serve to stabilize the position of the output-side rotary member 30. Accordingly, the stable operation of the brake device 100 is ensured, so that a good operating feel can be provided.

Although one embodiment of the present invention has been described above, the present invention is not limited to the above-described embodiment. Modifications can be made where appropriate to the specific configurations without departing from the gist of the present invention.

Figure 6:
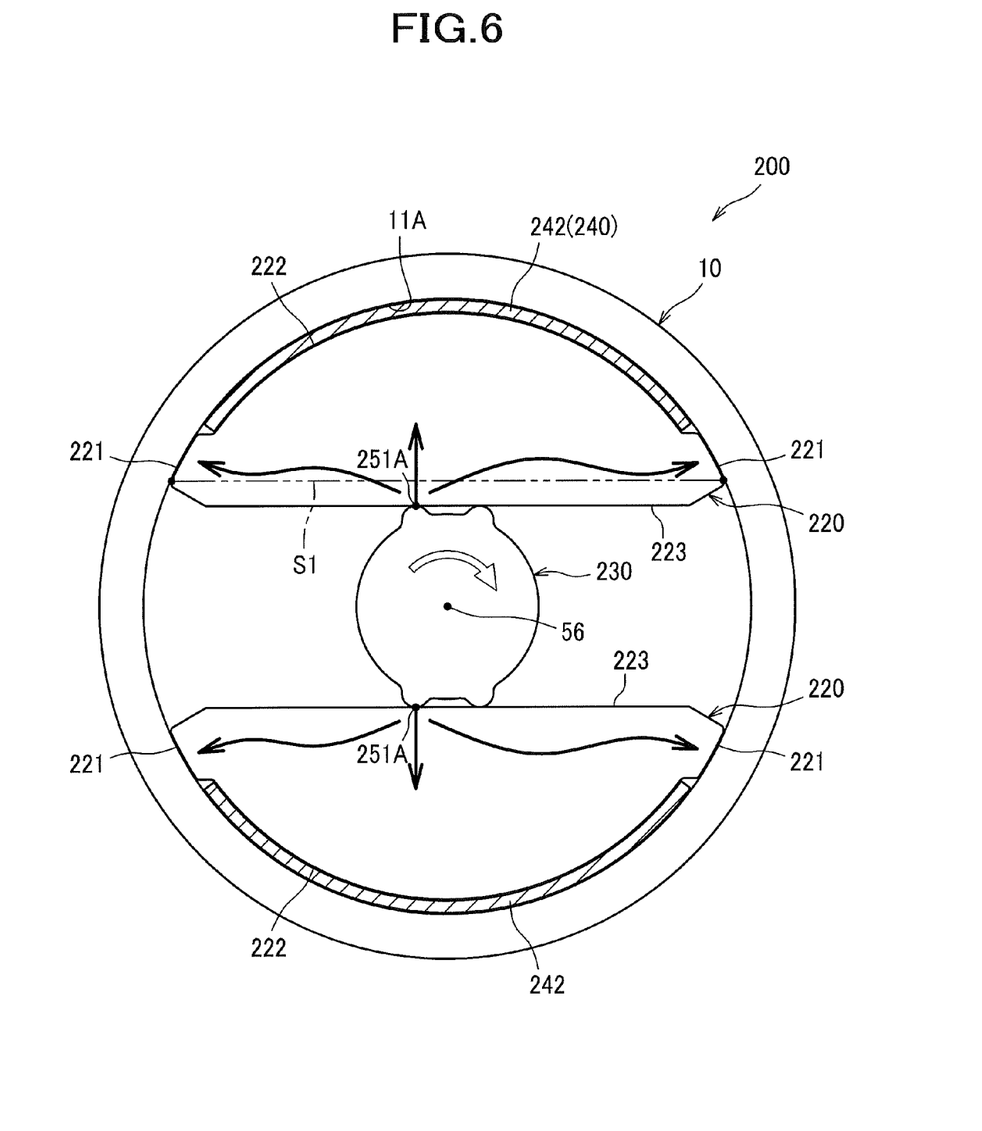
FIG. 6 is a sectional view of a brake device according to a first modified embodiment.

For example, the brake device may be configured to comprise two brake cams 220 evenly spaced in the circumferential direction, as the brake device 200 shown in FIG. 6. In this configuration, as well, the contact surfaces 223 may be located on the axis-of-rotation side that is one side of the both-end reference plane S1 on which the axis 56 of rotation of the output-side rotary member 230 is located, so that the contact points 251A at which the output-side rotary member 230 and the brake cams 220 are contactable are on the axis-of-rotation side that is one side of the both-end reference plane S1 on which the axis 56 of rotation of the output-side rotary member 230 is located; thereby, transmission of forces from the contact points 251A to the brake surfaces 221 can be made efficient.

In the brake device 200 shown in FIG. 6, plate-like power transmission members 242 are adopted for parts of an input-side rotary member 240 (entirety of which is not shown) instead of the pins 42 illustrated as the one embodiment above. These power transmission members 242 are arranged between the brake surfaces 221 at both ends in the circumferential direction and between the inner peripheral surface 11A of the outer race 10 and the outer peripheral surface 222 of the brake cam 220. By using such power transmission members 242, a great rotational force can be transmitted from the input-side rotary member 240 to the brake cam 220.

Figure 7:
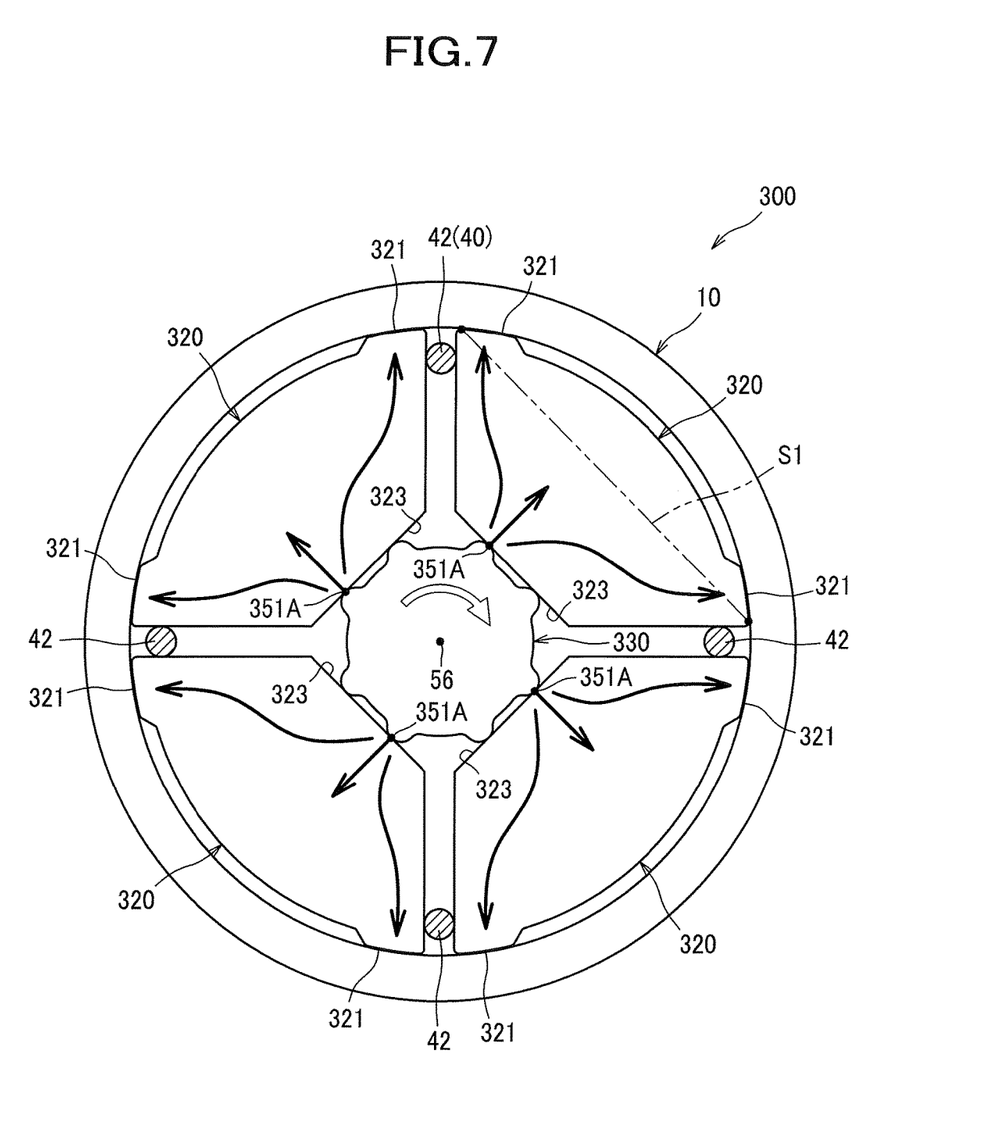
FIG. 7 is a sectional view of a brake device according to a second modified embodiment.

Moreover, the brake device may be configured to comprise four brake cams 320 evenly arranged in the circumferential direction, as the brake device 300 shown in FIG. 7. In this configuration, as well, the contact surfaces 323 may be located on the axis-of-rotation side that is one side of the both-end reference plane S1 on which the axis 56 of rotation of the output-side rotary member 330 is located, so that the contact points 351A at which the output-side rotary member 330 and the brake cams 320 are contactable are on the axis-of-rotation side that is one side of the both-end reference plane S1 on which the axis 56 of rotation of the output-side rotary member 330 is located; thereby, transmission of forces from the contact points 351A to the brake surfaces 321 can be made efficient.

Furthermore, the brake device 300 is configured to have eight spots provided at which the brake surfaces 321 press the outer race 10 outward, and thus the load imposed on each spot of the outer race 10 can be made smaller in comparison with the one embodiment. In the brake device 300 shown in FIG. 7 as well, the axis 56 of rotation is located inside a rectangle as formed by connecting four contact points 351A, and thus the brake device 300 can be operated stably.

Figure 8:
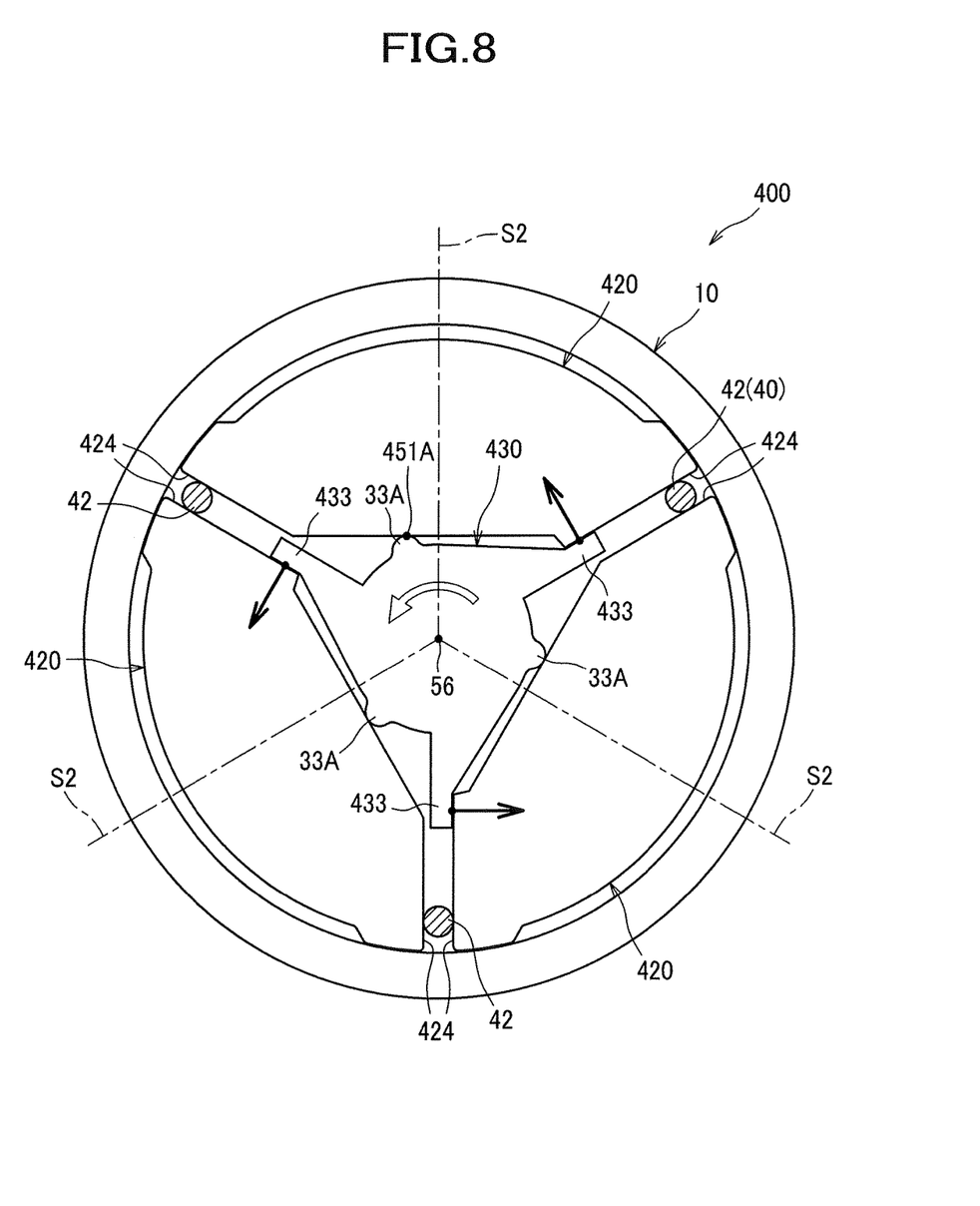
FIG. 8 is a sectional view of a brake device according to a third modified embodiment.

Moreover, the brake device may be configured to have no second protrusion 33B of the one embodiment, as the brake device 400 shown in FIG. 8. The output-side rotary member 430 of the brake device 400 includes driving force transmission contact portions 433 provided instead of the second protrusions 33B, which driving force transmission contact portions 433 are contactable from the counterclockwise direction with rotation input surfaces 424 that are end surfaces of the brake cams 420 in the circumferential direction. With this configuration, when the output-side rotary member 430 is caused to rotate clockwise, the brake cams 420 are not caused to rotate, that is, a braking force is produced; however, when the output-side rotary member 430 is caused to rotate counterclockwise, a rotational force is transmitted from the driving force transmission contact portions 433 to the brake cams 420 so that the output-side rotary member 430, the brake cams 420 and the input-side rotary member 40 can be rotated together.

Figure 9:
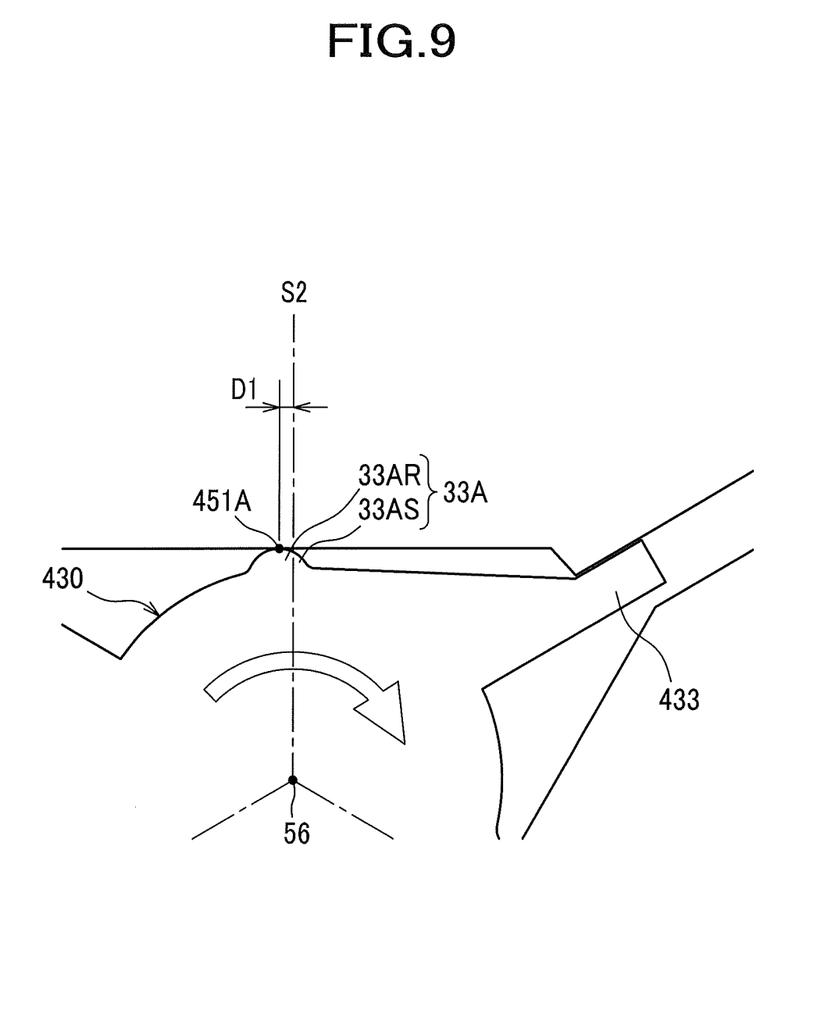
FIG. 9 is a partially enlarged sectional view for showing another example of arrangement of protrusions in the brake device according to the third modified embodiment.

In the third modified embodiment shown in FIG. 8, as well, the contact points 451A are in positions each shifted from the center plane S2. When the contact portions are formed as ridge-like protrusions configured to bulge toward radially outside of the output-side rotary member 430 as in the one embodiment, the extreme end 33AR of the protrusion 33A which includes the contact point 451A may be in a position that is not on the center plane S2, and the base end portion 33AS may be positioned to come across the center plane S2, as shown in FIG. 9. By setting the amount D1 of shift (of the contact point 451A from the center plane S2) as small as illustrated in this drawing, the brake can be operated satisfactorily.

In the above-described embodiment, the contact portions are formed as protrusions (first protrusions 33A, second protrusions 33B) provided on the output-side rotary member 30; on the other hand, such protrusions may be provided on the contact surfaces 23 of the brake cams 20 while the contact portions of the output-side rotary member 30 may be of flat surfaces.

In the above embodiment and respective modified embodiments, brake cams are evenly spaced in the circumferential direction, but they are not necessarily be arranged equidistantly. However, the brake cams evenly spaced in the circumferential direction may serve to stabilize the position of the output-side rotary member.

The invention claimed is:
1. A brake device, comprising:
   an outer race having a cylindrical inner peripheral surface;
   at least two brake cams arranged inside the outer race in a circumferential direction, each of the brake cams having brake surfaces located at both ends in the circumferential direction of a side of the brake cam facing the outer race, each of the brake surfaces being contactable with the cylindrical inner peripheral surface of the outer race; and an output-side rotary member arranged at radially inner sides of the respective brake cams, the output-side rotary member including contact portions contactable with surfaces of the brake cams facing the radially inner sides, the output-side rotary member being configured to rotate together with the brake cams, wherein a rotational motion received by the brake cams is transmitted to effect a motion of the output-side rotary member, while a rotational motion of the output-side rotary member as effected in at least one direction causes both of the brake surfaces at the both ends to be pressed concurrently on the inner peripheral surface of the outer race, and thus is not transmitted, effecting no motion of the brake cams, and contact points at which the respective contact portions and the respective brake cams are contactable with each other are on an axis-of-rotation side that is one side of a both-end reference plane on which an axis of rotation of the output-side rotary member is located, or on the both-end reference plane, the both-end reference plane being a plane connecting outer ends of the respective brake surfaces located at the both ends of a corresponding brake cam of the at least two brake cams.

2. The brake device according to claim 1, wherein the brake cams provided therein comprise three or more brake cams arranged in the circumferential direction.

3. The brake device according to claim 2, wherein the contact portions are contactable with the surfaces of the brake cams facing the radially inner sides in positions each shifted from a center plane that is a plane containing a center axis of the inner peripheral surface of the outer race and a midpoint between inner ends of the brake surfaces located at the both ends of a corresponding brake cam, and wherein the contact portions are provided on both sides of the center plane for each of the brake cams, and configured such that the rotational motion of the output-side rotary member as effected in either direction is not transmitted to the brake cams.

4. The brake device according to claim 2, wherein the axis of rotation of the output-side rotary member is located inside a polygon as formed by connecting the contact points at which the respective brake cams are contactable with the output-side rotary member.

5. The brake device according to claim 1, wherein the brake cams provided therein comprise three brake cams arranged in the circumferential direction, wherein the contact portions are contactable with the surfaces of the brake cams facing the radially inner sides in positions each shifted from a center plane that is a plane containing a center axis of the inner peripheral surface of the outer race and a midpoint between inner ends of the brake surfaces located at the both ends of a corresponding brake cam, and wherein an amount of shift of each contact portion from the center plane is not more than 16% of a distance between the inner ends of the brake surfaces located at the both ends of each of the brake cams.

6. The brake device according to claim 5, wherein the contact portions are provided on both sides of the center plane for each of the brake cams, and configured such that the rotational motion of the output-side rotary member as effected in either direction is not transmitted to the brake cams.

7. The brake device according to claim 1, wherein the contact portions are contactable with the surfaces of the brake cams facing the radially inner sides in positions each shifted from a center plane that is a plane containing a center axis of the inner peripheral surface of the outer race and a midpoint between inner ends of the brake surfaces located at the both ends of a corresponding brake cam, and wherein the contact portions are provided on both sides of the center plane for each of the brake cams, and configured such that the rotational motion of the output-side rotary member as effected in either direction is not transmitted to the brake cams.

8. The brake device according to claim 1, wherein the contact portions are contactable with the surfaces of the brake cams facing the radially inner sides in positions each shifted from a center plane that is a plane containing a center axis of the inner peripheral surface of the outer race and a midpoint between inner ends of the brake surfaces located at the both ends of a corresponding brake cam, and wherein the contact portions are formed as protrusions configured to protrude toward radially outside of the output-side rotary member, the protrusions being arranged in positions such that the protrusions come on the center plane when the output-side rotary member receives a rotational force.

9. The brake device according to claim 1, wherein each of the brake cams has an outer peripheral surface located between the brake surfaces, the outer peripheral surface having a radius smaller than a radius of each of the brake surfaces.

10. The brake device according to claim 9, wherein the contact portions are formed as protrusions configured to protrude toward radially outside of the output-side rotary member.

11. The brake device according to claim 1, wherein the surfaces of the brake cams facing the radially inner sides with which the contact portions are contactable are formed as flat surfaces facing a center axis of the outer race.

12. The brake device according to claim 11, wherein the contact portions are formed as protrusions configured to protrude toward radially outside of the output-side rotary member, such that a radially outwardly protruding end of each of the contact portions being contactable with respective one of the radially inwardly facing flat surfaces of the brake cams.

13. A brake device, comprising:
an outer race having a cylindrical inner peripheral surface;
at least two brake cams arranged inside the outer race in a circumferential direction, each of the brake cams having two brake surfaces and a cam-side contact portion, the brake surfaces being provided at both ends in the circumferential direction of a radially outer side of respective one of the brake cams and configured to be contactable with the inner peripheral surface of the outer race, the cam-side contact portion being provided at a radially inner side of the respective one of the brake cams, the brake cams being configured to engage with an input-side rotary member and receive a rotation moment from the input-side rotary member; and
an output-side rotary member arranged at radially inner sides of the brake cams, the output-side rotary member including output-side contact portions contactable with the cam-side contact portion, the output-side rotary member being configured to rotate together with the brake cams,
wherein a rotation moment received by the brake cams is transmitted to the output-side rotary member to cause the output-side rotary member to rotate, while a rotation moment of the output-side rotary member, as effected in at least one direction, received from the output-side rotary member by the brake cams causes both of the brake surfaces at the both ends to be pressed concurrently on the inner peripheral surface of the outer race, and thus fails to cause the input-side rotary member to rotate, and wherein regions of the cam-side contact portions of the respective brake cams, which are contactable with the output-side contact portions, are on a both-end reference plane connecting outer ends of the two brake surfaces of a corresponding brake cam, or on an axis-of-rotation side that is one side of the both-end reference plane on which an axis of rotation of the output-side rotary member is located.

14. The brake device according to claim 13, wherein regions of the cam-side contact portions of the respective brake cams, which are contactable with the output-side contact portions, are in positions each shifted from a center plane that is a plane containing a center axis of the inner peripheral surface of the outer race and a middle between inner ends of the two brake surfaces located at the both ends of a corresponding brake cam.

15. The brake device according to claim 14, wherein the output-side contact portions are contactable with the cam-side contact portions of each of the brake cams on both sides of the center plane.

16. The brake device according to claim 13, wherein the cam-side contact portions of the respective brake cams are each formed as a flat surface facing the radially inner side, and the output-side contact portions are formed as protrusions configured to protrude toward radially outside of the output-side rotary member, one or more of the protrusions being configured such that base portions of the protrusions come across the center plane when extreme ends of the protrusions are in contact with the cam-side contact portion of a corresponding brake cam.

17. The brake device according to claim 13, wherein the brake cams provided therein comprise three or more brake cams arranged in the circumferential direction, and wherein the axis of rotation of the output-side rotary member is located inside a polygon as formed by connecting positions at which the output-side contact portions are contactable with the cam-side contact portions of the corresponding brake cams, respectively.

* * * * *